US012363361B2

(12) United States Patent
Yim et al.

(10) Patent No.: US 12,363,361 B2
(45) Date of Patent: Jul. 15, 2025

(54) METHOD AND APPARATUS FOR TRANSMITTING 8K SHVC SERVICE BASED ON BROADCAST NETWORK INTERCONNECTION

(71) Applicant: ELECTRONICS AND TELECOMMUNICATIONS RESEARCH INSTITUTE, Daejeon (KR)

(72) Inventors: Hyun-Jeong Yim, Sejong-si (KR); Sung-Ik Park, Daejeon (KR); Bo-Mi Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/242,775

(22) Filed: Sep. 6, 2023

(65) Prior Publication Data
US 2024/0155165 A1    May 9, 2024

(30) Foreign Application Priority Data

Nov. 4, 2022   (KR) .................. 10-2022-0145841

(51) Int. Cl.
*H04N 21/235*  (2011.01)
*H04N 21/643*  (2011.01)
(52) U.S. Cl.
CPC ......... *H04N 21/235* (2013.01); *H04N 21/643* (2013.01)
(58) Field of Classification Search
CPC .......................... H04N 21/235; H04N 21/643
See application file for complete search history.

(56) References Cited

U.S. PATENT DOCUMENTS 10,681,426 B2    6/2020  Kwak et al.
10,834,473 B2 *  11/2020  Clift ................. H04N 21/41407
(Continued)

FOREIGN PATENT DOCUMENTS

KR   10-2017-0057978 A    5/2017
KR   10-2017-0102249 A    9/2017
(Continued)

OTHER PUBLICATIONS

Hyun-Jeong Yim et al., "8K-UHD service platform using SHVC for ATSC 3.0-based terrestrial broadcasting", 2021 IEEE International Symposium on Broadband Multimedia Systems and Broadcasting (BMSB), Aug. 4, 2021.
(Continued)

*Primary Examiner* — Nnenna N Ekpo
(74) *Attorney, Agent, or Firm* — LRK PATENT LAW FIRM

(57) ABSTRACT

Disclosed herein are a method and apparatus for transmitting an 8K Scalable High Efficiency Video Coding (SHVC) service based on broadcast network interconnection. The method includes defining signaling information for the 8K SHVC service, and delivering the defined signaling information to a MPEG Media Transport (MMT)/Real time Object delivery Over Unidirectional Transport (ROUTE) packetizer or to a gateway, separating 8K content into a base layer compatible with a broadcast network and an enhancement layer compatible with a communication network, delivering the base layer from the MMT/ROUTE packetizer to a receiver through the gateway and a transmitter, and delivering the enhancement layer to the receiver through a Dynamic Adaptive Streaming over HTTP (DASH) server.

14 Claims, 5 Drawing Sheets

| SERVICE | 1..N | | SERVICE INFORMATION. |
|---|---|---|---|
| OMITTED... | | | |
| @broadbandAccessRequired | 0..1 | BOOLEAN | INDICATES WHETHER BROADBAND ACCESS IS REQUIRED FOR A RECEIVER TO MAKE A MEANINGFUL PRESENTATION OF THE SERVICE. |
| @essential | 0..1 | BOOLEAN | INDICATES IF THE ESSENTIAL PORTION OF THE SERVICE IS DELIVERED VIA THIS BROADCAST STREAM. |
| @configuration | 0..1 | TOKEN | DECLARES THE SERVICE CONFIGURATION." DEFINE BROADCAST, BROADBAND, AND HYBRID |
| broadcastPortion | 0..1 | | |
| @essential | 0..1 | | INDICATES IF THE ESSENTIAL PORTION OF THE SERVICE IS DELIVERED VIA THIS BROADCAST STREAM. |
| PortionCapabilities | 0..1 | sa:CapabilitiesType | REQUIRED CAPABILITIES FOR DECODING AND MEANINGFULLY PRESENTING CONTENT OF THIS BROADCAST PORTION. |
| broadbandPortion | 0..1 | | INDICATES THAT IT IS DEFINED AS OTHER NETWORK PORTIONS AS WELL AS COMMUNICATION NETWORK, AND THEN INFORMATION ABOUT SERVICE DELIVERED TO NETWORKS OTHER THAN CURRENT BROADCAST NETWORK CAN ALSO BE DESCRIBED |
| @essential | 0..1 | BOOLEAN | INDICATES IF THE ESSENTIAL PORTION OF THE SERVICE IS DELIVERED VIA BROADBAND NETWORK. |
| PortionCapabilities | 0..1 | sa:CapabilitiesType | REQUIRED CAPABILITIES FOR DECODING AND MEANINGFULLY PRESENTING CONTENT OF THIS BROADBAND PORTION. |
| SvcCapabilities | 0..1 | sa:CapabilitiesType | REQUIRED CAPABILITIES FOR DECODING AND MEANINGFULLY PRESENTING CONTENT OF THIS SERVICE. |
| OMITTED... | | | |

(56) References Cited

U.S. PATENT DOCUMENTS

| | | | |
|---|---|---|---|
| 11,082,728 B2 | 8/2021 | Yim et al. | |
| 2017/0171583 A1* | 6/2017 | Kwon | H04N 21/44016 |
| 2018/0234741 A1 | 8/2018 | Kim et al. | |
| 2020/0077126 A1* | 3/2020 | Yim | H04N 21/631 |
| 2023/0012548 A1 | 1/2023 | Kitahara et al. | |

FOREIGN PATENT DOCUMENTS

| | | | |
|---|---|---|---|
| KR | 10-1960317 B1 | 3/2019 | |
| KR | 10-1999801 B1 | 7/2019 | |

OTHER PUBLICATIONS

Jong-Ho Paik et al, "Design and Implementation of Transmission Scheduler for Terrestrial UHD Contents", JBE vol. 24, No. 1, Jan. 2019.

"ATSC Candidate Standard: Revision of ATSC 3.0 Interactive Content", ATSC S34-306r1, Apr. 27, 2018.

* cited by examiner

STLSERVICE@CONFIGURATION SEMANTIC : THIS ATTRIBUTE IDENTIFIES THE SERVICE CONFIGURATION. IT SHOULD BE PRESENT ALWAYS, BUT WHEN NOT PRESENT THE DEFAULT SERVICE CONFIGURATION CAN BE DETERMINED AS DESCRIBED IN SECTION 8.2.1.2. WHEN PRESENT IT SHALL BE ONE OF THE FOLLOWING STRING TOKENS:
- BROADBAND
- BROADCAST
- Hybrid

FIG. 4

| SERVICE | 1..N | | SERVICE INFORMATION. |
|---|---|---|---|
| OMITTED... | | | |
| @broadbandAccessRequired | 0..1 | BOOLEAN | INDICATES WHETHER BROADBAND ACCESS IS REQUIRED FOR A RECEIVER TO MAKE A MEANINGFUL PRESENTATION OF THE SERVICE. |
| @essential | 0..1 | BOOLEAN | INDICATES IF THE ESSENTIAL PORTION OF THE SERVICE IS DELIVERED VIA THIS BROADCAST STREAM. |
| @configuration | 0..1 | TOKEN | DECLARES THE SERVICE CONFIGURATION." DEFINE BROADCAST, BROADBAND, AND HYBRID |
| broadcastPortion | 0..1 | | |
|     @essential | 0..1 | | INDICATES IF THE ESSENTIAL PORTION OF THE SERVICE IS DELIVERED VIA THIS BROADCAST STREAM. |
|     PortionCapabilities | 0..1 | sa:CapabilitiesType | REQUIRED CAPABILITIES FOR DECODING AND MEANINGFULLY PRESENTING CONTENT OF THIS BROADCAST PORTION. |
| broadbandPortion | 0..1 | | INDICATES THAT IT IS DEFINED AS OTHER NETWORK PORTIONS AS WELL AS COMMUNICATION NETWORK, AND THEN INFORMATION ABOUT SERVICE DELIVERED TO NETWORKS OTHER THAN CURRENT BROADCAST NETWORK CAN ALSO BE DESCRIBED |
|     @essential | 0..1 | BOOLEAN | INDICATES IF THE ESSENTIAL PORTION OF THE SERVICE IS DELIVERED VIA BROADBAND NETWORK. |
|     PortionCapabilities | 0..1 | sa:CapabilitiesType | REQUIRED CAPABILITIES FOR DECODING AND MEANINGFULLY PRESENTING CONTENT OF THIS BROADBAND PORTION. |
| SvcCapabilities | 0..1 | sa:CapabilitiesType | REQUIRED CAPABILITIES FOR DECODING AND MEANINGFULLY PRESENTING CONTENT OF THIS SERVICE. |
| OMITTED... | | | |

FIG. 5

METHOD AND APPARATUS FOR TRANSMITTING 8K SHVC SERVICE BASED ON BROADCAST NETWORK INTERCONNECTION

CROSS REFERENCE TO RELATED APPLICATION

This application claims the benefit of Korean Patent Application No. 10-2022-0145841, filed Nov. 4, 2022, which is hereby incorporated by reference in its entirety into this application.

BACKGROUND OF THE INVENTION

1. Technical Field

The present disclosure relates to a method and apparatus for providing an 8K Scalable High Efficiency Video Coding (SHVC) service based on a broadcast network in an environment in which a media service is delivered using the broadcast network or a communication network.

2. Description of Related Art

Recently, in Digital Video Broadcasting (DVB), Advanced Television Systems Committee (ATSC), 3rd Generation Partnership Project (3GPP), or the like, discussion on technology for optimizing media transmission by efficiently utilizing a broadcast network and a communication network has been conducted. When a service based on convergence of a communication network such as a 5G network and a terrestrial broadcast network is provided, the provision of a broadcasting service may be further facilitated in various aspects such as service coverage expansion, service quality assurance, and the provision of high-quality media services.

In particular, when the broadcasting service is provided through interconnection between a communication network (5G network) and a broadcast network (ATSC 3.0), ATSC 3.0 and 5G Multimedia Broadcast Multicast Service (MEMS) signals may be time-divided and transmitted using UHF band High Power High Tower (HPHT)-based transmission infrastructure. Together with this, when packet aggregation transmission technology is used at a protocol level, it may be combined with a service separated and delivered from a physical layer, and thus the combined service may be reproduced at a receiver.

Scalable High Efficiency Video Coding (SHVC) used in scalable service transmission technology for 8K-UHD broadcasting is a scalable coding scheme based on High Efficiency Video Coding (HEVC).

In ATSC 3.0 standards, a scalable codec service that is capable of separating content into a base layer (BL) and an enhancement layer (EL) and transmitting the base layer and the enhancement layer may be provided. Methods for transmitting these two layers may include various methods depending on the network through which service is delivered and service delivery strategies. However, in the current ATSC 3.0 standards, a service ranging to 4K-UHD content is defined as a target service, and thus there is no method capable of delivering information about an 8K-UHD service to the receiver.

SUMMARY OF THE INVENTION

Accordingly, the present disclosure has been made keeping in mind the above problems occurring in the prior art, and an object of the present disclosure is to provide a method and apparatus for transmitting an 8K SHVC service based on broadcast network interconnection, which can provide an 8K-UHD service using a broadcast network or a communication network.

In accordance with an aspect of the present disclosure to accomplish the above object, there is provided a method for transmitting an 8K Scalable High Efficiency Video Coding (SHVC) service based on broadcast network interconnection, including defining signaling information for the 8K SHVC service, and delivering the defined signaling information to a MPEG Media Transport (MMT)/Real time Object delivery Over Unidirectional Transport (ROUTE) packetizer or to a gateway, separating 8K content into a base layer compatible with a broadcast network and an enhancement layer compatible with a communication network, delivering the base layer from the MMT/ROUTE packetizer to a receiver through the gateway and a transmitter, and delivering the enhancement layer to the receiver through a Dynamic Adaptive Streaming over HTTP (DASH) server.

The signaling information may define a hybrid service as a value of an 8K SHVC code and a configuration attribute of a SLT.Service element.

Any one value of 0x0520 to 0x057F for a Receiver Media Player (RMP) and 0x05A0 to 0x05FF for an Application Media Player (AMP) may be assigned to the 8K SHVC code.

When the configuration attribute is the hybrid service, information about broadcast data and information about broadband data may be respectively delivered, and information about capabilities of respective portions may be signaled.

The receiver may obtain the base layer over the broadcast network and obtain the enhancement layer using a DASH protocol, thus rendering the 8K SHVC service.

The receiver may receive Low Level Signaling (LLS) and Service Layer Signaling (SLS) in which information about a broadcasting service is described through processing of broadcast reception.

The receiver may be configured to, when it is determined that it is impossible to provide a service for the enhancement layer, receive only data for the base layer, thus rendering a 4K service.

In accordance with another aspect of the present disclosure to accomplish the above object, there is provided an apparatus for transmitting an 8K Scalable High Efficiency Video Coding (SHVC) service based on broadcast network interconnection, including memory configured to store a control program for providing an 8K SHVC service based on broadcast network interconnection, and a processor configured to execute the control program stored in the memory, wherein the processor is configured to define signaling information for the 8K SHVC service, deliver the defined signaling information to a MPEG Media Transport (MMT)/ Real time Object delivery Over Unidirectional Transport (ROUTE) packetizer or to a gateway, separate 8K content into a base layer compatible with a broadcast network and an enhancement layer compatible with a communication network, deliver the base layer from the MMT/ROUTE packetizer to a receiver through the gateway and a transmitter, and deliver the enhancement layer to the receiver through a Dynamic Adaptive Streaming over HTTP (DASH) server.

The signaling information may define a hybrid service as a value of an 8K SHVC code and a configuration attribute of a SLT.Service element.

Any one value of 0x0520 to 0x057F for a Receiver Media Player (RMP) and 0x05A0 to 0x05FF for an Application Media Player (AMP) may be assigned to the 8K SHVC code.

When the configuration attribute is the hybrid service, information about broadcast data and information about broadband data may be respectively delivered, and information about capabilities of respective portions may be signaled.

The receiver may obtain the base layer over the broadcast network and obtain the enhancement layer using a DASH protocol, thus rendering the 8K SHVC service.

The receiver may receive Low Level Signaling (LLS) and Service Layer Signaling (SLS) in which information about a broadcasting service is described through processing of broadcast reception.

The receiver may be configured to, when it is determined that it is impossible to provide a service for the enhancement layer, receive only data for the base layer, thus rendering a 4K service.

In accordance with a further aspect of the present disclosure to accomplish the above object, there is provided a method for transmitting/receiving an 8K SHVC service based on broadcast network interconnection, including defining signaling information for the 8K SHVC service, delivering the defined signaling information to a MPEG Media Transport (MMT)/Real time Object delivery Over Unidirectional Transport (ROUTE) packetizer or to a gateway, separating 8K content into a base layer compatible with a broadcast network and an enhancement layer compatible with a communication network, delivering the base layer from the MMT/ROUTE packetizer to a receiver through the gateway and a transmitter, and delivering the enhancement layer to the receiver through a Dynamic Adaptive Streaming over HTTP (DASH) server, and receiving the base layer and the enhancement layer, thus rendering the 8K SHVC service.

The signaling information may define a hybrid service as a value of an 8K SHVC code and a configuration attribute of a SLT.Service element.

Any one value of 0x0520 to 0x057F for a Receiver Media Player (RMP) and 0x05A0 to 0x05FF for an Application Media Player (AMP) may be assigned to the 8K SHVC code.

When the configuration attribute is the hybrid service, information about broadcast data and information about broadband data may be respectively delivered, and information about capabilities of respective portions may be signaled.

The receiver may obtain the base layer over the broadcast network and obtain the enhancement layer using a DASH protocol, thus rendering the 8K SHVC service.

The receiver may receive Low Level Signaling (LLS) and Service Layer Signaling (SLS) in which information about a broadcasting service is described through processing of broadcast reception.

BRIEF DESCRIPTION OF THE DRAWINGS

The above and other objects, features and advantages of the present disclosure will be more clearly understood from the following detailed description taken in conjunction with the accompanying drawings, in which:

FIG. 4 is a diagram illustrating an example of the configuration property of the SLT.Service element according to an embodiment;

FIG. 5 is a diagram illustrating service elements defined for 8K SHVC service signaling based on broadcast network convergence according to an embodiment.

DESCRIPTION OF THE PREFERRED EMBODIMENTS

Figure 1:
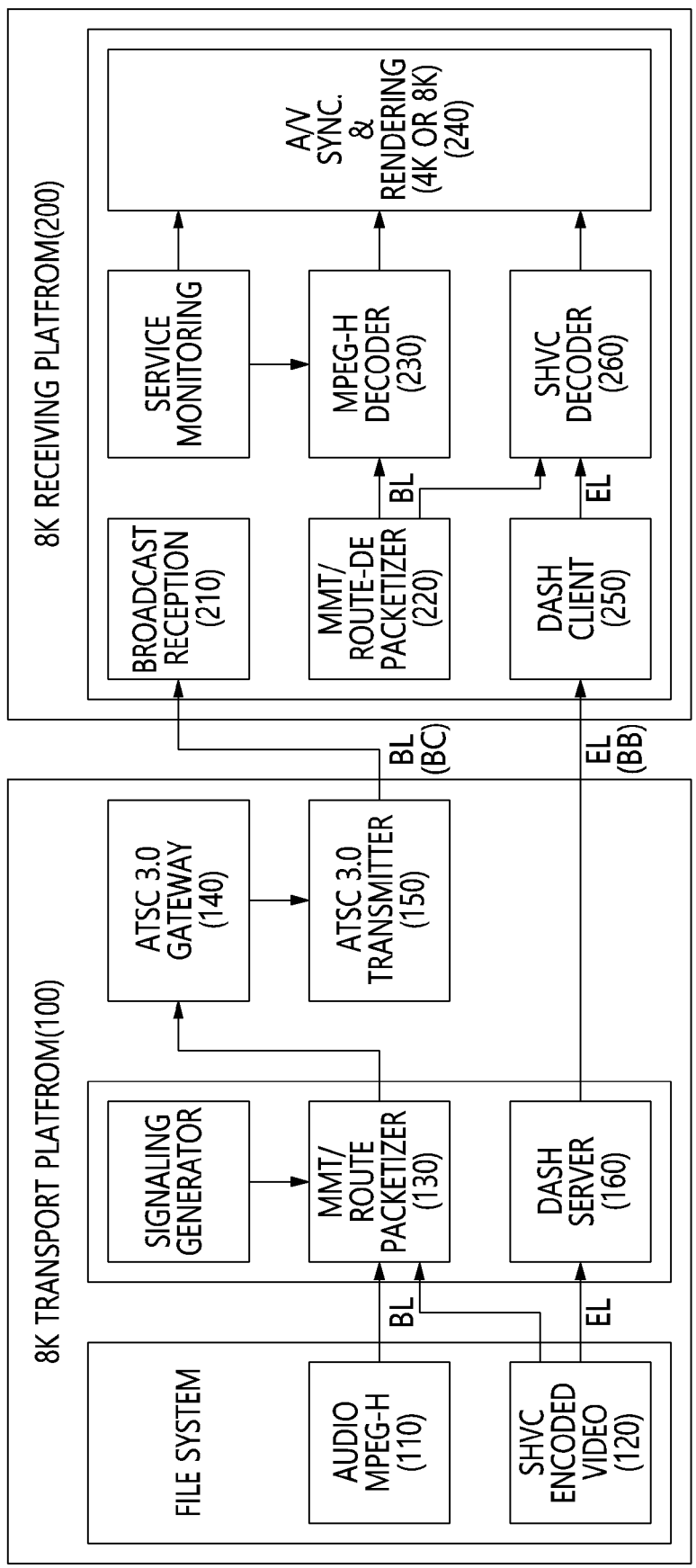
FIG. 1 is a block diagram illustrating an 8K SHVC service transmission/reception system based on broadcast network interconnection according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present disclosure will now be described in detail with reference to the accompanying drawings. Like numerals refer to like elements throughout, and overlapping descriptions will be omitted.

In the present specification, the term "broadcast data" implies data delivered through the broadcast network in the hybrid service, and the term "broadband data" implies data delivered through broadband network in the hybrid service.

FIG. 1 is a block diagram illustrating an 8K SHVC service transmitting/receiving system based on broadcast network interconnection according to an embodiment.

Referring to FIG. 1, the 8K SHVC service transmitting/receiving system based on broadcast network interconnection according to the embodiment may include an 8K SHVC service transmitting apparatus (or an 8K transport platform or transmitter) 100 and an 8K SHVC service receiving apparatus (or an 8K receiving platform or receiver) 200.

The 8K SHVC service transmitting apparatus 100 may include an audio codec (Audio MPEG-H) 110, a video layer separator 120, a MPEG Media Transport (MMT)/Real time Object delivery Over Unidirectional Transport (ROUTE) packetizer 130, an ATSC 3.0 gateway 140, an ATSC 3.0 transmitter 150, a Dynamic Adaptive Streaming over HTTP (DASH) server 160, and a signaling generator 170.

Figure 2:
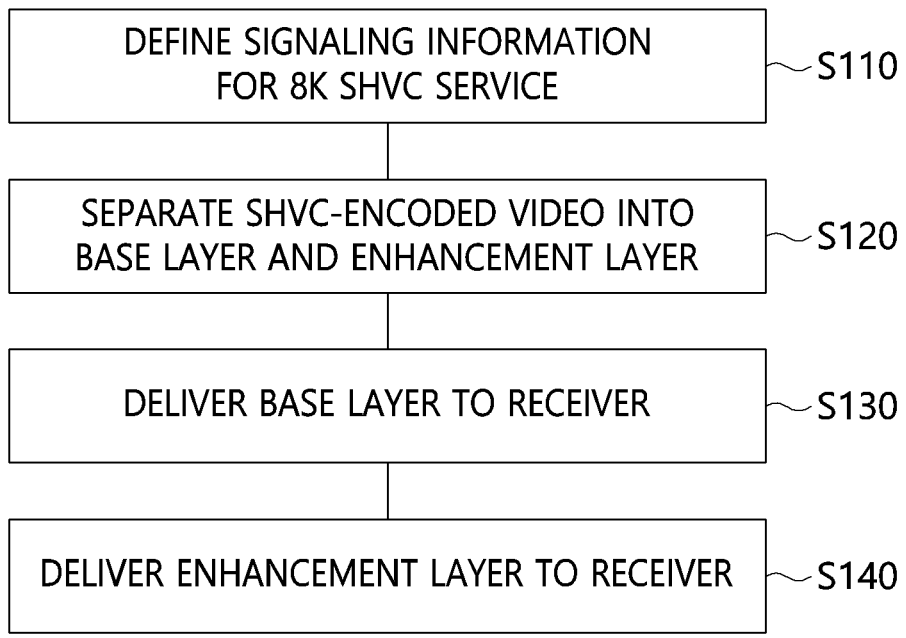
FIG. 2 is a flowchart illustrating an 8K SHVC service transmitting method performed by an 8K SHVC service transmitting apparatus according to an embodiment.

FIG. 2 is a flowchart illustrating an 8K SHVC service transmitting method performed by an 8K SHVC service transmitting apparatus according to an embodiment.

Referring to FIG. 2, the signaling generator according to an embodiment of the present disclosure may define signaling information for an 8K SHVC service, and may deliver the defined signaling information to the MMT/ROUTE packetizer or the ATSC 3.0 gateway at step S110. The signaling information for the 8K SHVC service may be predefined, and a process of defining the signaling information will be described in detail later.

Thereafter, an SHVC-encoded video may be separated into a base layer (BL) and an enhancement layer (EL) through the video layer separator and then be transmitted at step S120.

The base layer may be delivered in the form of an RF signal to the 8K SHVC service receiving apparatus through the MMT/ROUTE packetizer, the ATSC 3.0 gateway, and the ATSC 3.0 transmitter at step S130.

The enhancement layer may be delivered to the DASH server, and may then be transmitted to the 8K SHVC service receiving apparatus in a DASH-based unicast manner at step S140.

In order to obtain service information in ATSC 3.0, a Service List Table (SLT) included in Low Level Signaling (LLS) needs to be transmitted by the transmitting apparatus, and the receiving apparatus may first acquire the service information and then comprehend the characteristics of a delivered broadcasting service. When the LLS information is delivered to the MMT/ROUTE packetizer, it may be transmitted to the ATSC 3.0 gateway in a bypass manner.

Audio may be delivered from an audio codec to the 8K SHVC service receiving apparatus through the MMT/ROUTE packetizer, the ATSC 3.0 gateway, and the ATSC 3.0 transmitter.

Referring back to FIG. 1, the 8K SHVC service receiving apparatus 200 may include a broadcast receiver 210, an MMT/ROUTE depacketizer 220, an MPEG-H decoder 230, a rendering unit 240, a DASH client 250, a SHVC decoder 260, and a service monitoring unit 270.

Figure 3:
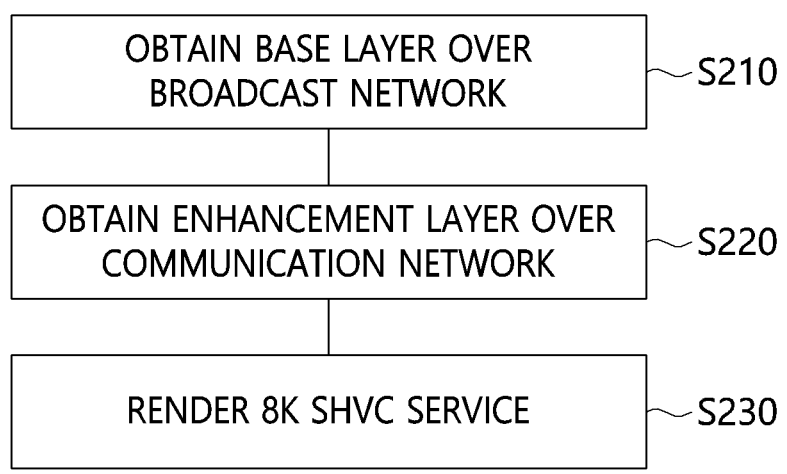
FIG. 3 is a flowchart illustrating an 8K SHVC service receiving method performed by an 8K SHVC service receiving apparatus according to an embodiment.

FIG. 3 is a flowchart illustrating an 8K SHVC service receiving method performed by an 8K SHVC service receiving apparatus according to an embodiment.

Referring to FIG. 3, the 8K SHVC service receiving apparatus may receive Low Level Signaling (LLS) and Service Layer Signaling (SLS) through processing of broadcast reception.

When the 8K SHVC service can be received through broadcasting convergence network-based transmission/reception technology, the base layer may be obtained over the broadcast network at step S210, and the enhancement layer may be obtained using a DASH protocol over the communication network at step S220.

The 8K SHVC service may be rendered using the base layer and the enhancement layer at step S230.

When it is determined that, after the SLT defined in the present disclosure is received, a service for the enhancement layer cannot be provided, only data for the base layer is received, and thus a 4K service may be rendered.

Meanwhile, an overview of a method for providing the 8K SHVC service based on convergence transmission of the broadcast network and the communication network (5G) will be described in detail below.

During a broadcast transmission/reception process, in order to indicate that the corresponding service is an 8K service using broadcast network-based convergence transmission/reception technology, required information is described at the following signaling level, and thus the receiving apparatus needs to be able to determine whether the service can be reproduced before an actual media stream is received.

1. It needs to be signaled that a service transmitted at the highest level of the signaling technology is the 8K service (8K resolution service).
2. SHVC is described as video codec information, and thus it needs to be signaled that the corresponding service is service (content) in which video data is separated into a base layer and an enhancement layer and then transmitted.
3. It needs to be signaled that the base layer is independently reproducible content at 4K service (resolution) even though the enhancement layer is not received.
4. It needs to be signaled that an enhancement layer for reproducing an 8K service is transmitted over another network other than the broadcast network.

In order to obtain service information in ATSC 3.0, a Service List Table (SLT) included in LLS needs to be transmitted by the transmitting apparatus, and the receiving apparatus may first acquire the service information and then comprehend the characteristics of a delivered broadcasting service.

In SLTCapabilities among pieces of information described in the SLT, decoding information or presentation-related information for indicating whether all services described in the SLT are processible services from the standpoint of the receiving apparatus may be described. The receiving apparatus may use the information to determine whether each service enables reception processing.

Similarly, in SvcCapabilities described at the service level of SLT, information required to determine whether each service is a service processible by the receiving apparatus may be described. Capability Codes used in SLTCapabilities and SvcCapabilities are defined in A/332. Therefore, details for delivery of convergence broadcasting-based 8K SHVC service described in the embodiment may be applied to SLTCapabilities or SvcCapabilities of SLT in the LLS, and the corresponding details may be reflected in A/331 and A/332 standards.

A method for describing information about 8K resolution video will be described below.

In A/332, Capability Codes for respective types of the receiving apparatus are defined, code indicating 8K resolution needs to be defined, as in the case where, of the media type (Receiver Media Player: RMP) of the Capability Category and the media type (Application Media Player: AMP)

of the Capability Category, 0x050F (RMP) and 0x058F (AMP) indicate 4K resolution.

A code value may be defined as, for example, 0x0520 (RMP 8K) or 0x05A0 (AMP 8K). Alternatively, one value of 0x0520 to 0x057F defined in Reserved for future ATSC use of the Capability Category; Media Types (RMP) part and 0x05A0 to 0x05FF defined in Reserved for future ATSC use of Capability Category; Media Types (AMP) part may be assigned and used. The information about 8K resolution defined in this way may be used in SLTCapabilities and data (e.g., Capability Codes or the like) related to information about a service currently delivered to the receiver.

A method for describing 8K SHVC codec information is described as follows.

In ATSC 3.0, SLTCapabilities code for indicating the codec of the service at an SLT which is at the highest level is present, and the code values are defined as follows.
1. Capability Codes 0x0512: ATSC 3.0 SHVC Video (RMP),
2. Capability Codes 0x0512: ATSC 3.0 SHVC Video (AMP)

However, because only 4K resolution is defined as a target service resolution in ATSC 3.0, Capability Codes for 8K SHVC need to be separately formed for RMP and for AMP, or details of resolution limitations in ATSC 3.0 standards need to be extended to 8K. Therefore, the present disclosure may signal that the corresponding service is the 8K SHVC service by defining the value of an 8K SHVC code.

As the Capability Codes, an 8K SHVC value represents that the currently delivered service is a service for separating content into BL and EL and transmitting the BL and EL using a scalable codec so as to provide 8K resolution. Furthermore, the case where only the BL is received may mean that the corresponding service may be used only 4K resolution, and the case where both BL and EL are received may mean that an 8K resolution service may be provided. This code value does not represent information about a delivery network, and may represent only information about a codec level.

As each of the Capability Codes for 8K SHVC, one value of 0x0520 to 0x057F defined in Reserved for future ATSC use of the Capability Category; Media Types (RMP) part and 0x05A0 to 0x05FF defined in Reserved for future ATSC use of Capability Category; Media Types (AMP) part may be assigned and used. In an embodiment, values defined in the Media Types category may be used as follows.
1. Capability Codes 0x0521: ATSC 3.0 8K SHVC Video (RMP)
2. Capability Codes 0x05A1: ATSC 3.0 8K SHVC Video (AMP)

As a method of describing information about broadcast network convergence transmission, the provision of convergence network-based 8K SHVC service in the current ATSC 3.0 has the following problems.

The ATSC 3.0 A/331 standard prescribes that, when the use of a communication network is required for meaningful representation of the service, the @broadbandAccessRequired field is set to and used by 'True', and a default value is defined as 'false'.

In an embodiment, the 8K SHVC service is delivered based on conversion transmission technology of a broadcast network and a 5G network, and 8K content is transmitted/received after the layer of the 8K content is separated into a base layer and an enhancement layer. In this case, the base layer may be transmitted through an ATSC 3.0 4K-UHD service in the form compatible with an existing terrestrial broadcasting service, and the enhancement layer may be provided over another network such as a communication.

Therefore, there is a need to notify the 8K receiving apparatus that a connection to the communication network is essentially needed so as to provide the 8K service. Here, when broadbandAccessRequired is set to 'True', a receiver connectable to the communication network, among 8K receivers, may receive both the base layer and the enhancement layer over the broadcast network and the communication network, thus providing the 8K SHVC service.

However, when 4K resolution, 8K resolution, and 8K SHVC are received as Capability Code values and service information is delivered as 'broadbandAccessRequired=true', a receiver that is not connected to the communication network may determine that the corresponding service cannot be reproduced, and may not provide the service. The main purpose of the 8K SHVC service is to provide a 4K video in the case where it is impossible to reproduce an 8K video. Accordingly, when the receiving apparatus filters the reproduction of service by its own determination as described above, it conflicts with the purpose of service provision for maintaining compatibility with a 4K video. Due thereto, problem situation 1, problem situation 2, and problem situation 3 may occur.

Problem situation 1) it is determined that a connection to a communication network is required for service reproduction, and then reception of the service may not be performed. Therefore, the reproduction of an 8K service may not be performed. (4K Broadcast (BC) only receiver-4K service-Broadband (BB) True)

Problem situation 2) it is determined that a connection to a communication network is required for service reproduction, and then reception of the service may not be performed. Therefore, the reproduction of a 4K service may not be performed. (8K Broadcast (BC) only receiver-4K service-Broadband (BB) True)

Problem situation 3) it is determined that a connection to a communication network is required for service reproduction, and then reception of the service may not be performed. Therefore, the provision of a 4K service and an 8K service may not be performed. (8K Broadcast (BC) only receiver-8K service-Broadband (BB) True)

When broadbandAccessRequired=false is set, the receiver may construe that a connection to the communication network is unnecessary so as to provide the corresponding service, and even a receiver incapable of connecting to the communication network may perform an operation of providing the corresponding service. Furthermore, a situation in which it can be determined whether the corresponding service is an available service capable of being actually provided by the receiver may occur only when undergoing a process of additionally obtaining and determining lower information related to service signaling. Due thereto, problem situation 4 and problem situation 5 may occur.

Problem situation 4) it is determined that a connection to a communication network is not necessary for reproduction of service and the corresponding receiver is a receiver capable of receiving an 8K service, and thus the receiver intends to receive and reproduce the 8K service so as to reproduce the 8K service, but an actual enhancement layer is provided over the communication network, thus making it impossible to reproduce the 8K service. (8K BC only receiver-8K service-BB false)

Problem situation 5) it is determined that a connection to a communication network is not necessary to reproduce service, and there is a possibility that a service acquisition process using the communication network will be ignored. In this case, the receiver needs to implement an independent method for acquiring the 8K service. (8K BC-BB only receiver-8K service-BB false)

A method for providing an 8K SHVC service compatible with a 4K receiver based on a broadcasting convergence network will be described below.

In order to provide the 8K SHVC service compatible with the 4K receiver based on the broadcasting convergence network, service signaling indicating that the service delivered over the current broadcast network is the 8K SHVC service and that the base layer (BL) of the service is delivered over the broadcast network and the enhancement layer (EL) is delivered over the communication network needs to be provided. Further, a receiver that receives only the BL over the broadcast network may provide a 4K broadcasting service, and may use both the broadcast network and the communication network, and a receiver that is capable of providing an 8K broadcasting service needs to be able to provide an 8K broadcasting service by obtaining both the base layer (BL) and the enhancement layer (EL).

However, the configuration attributes of service elements of the current ATSC 3.0 SLT may indicate only 'Broadcast' and 'Broadband', and do not define a hybrid service. Therefore, when the service is based on hybrid transmission in which a service is represented through convergence with components delivered over the communication network, a problem may arise in that the receiver cannot finally reproduce the service beyond the receiver's capabilities after receiving all streams. Therefore, in order to solve this problem, detailed specifications for respective delivered media streams need to be additionally described.

FIG. 4 is a diagram illustrating an example of the configuration property of the SLT.Service element according to an embodiment.

As illustrated in FIG. 4, a hybrid service may be defined as the configuration attribute of the SLT.Service element.

Further, it is intended to solve the problems of the current standard for 8K SHVC service transmission through a method of additionally describing BC service capabilities and BB service capabilities when the configuration attribute is a hybrid service. This method may be a method for minimizing standard modification in the future while conforming to the existing scheme of an A/331 standard, and may be summarized as a Service Delivery via Multiple networks from the standpoint of a standard, similarly to a scheme for delivering the corresponding service through two or more RF channels.

In detail, the present disclosure defines the attribute of a service configuration as a hybrid service, and describes whether a portion delivered over broadcast (BC) and a portion delivered over broadband (BB) in the hybrid service is an essential portion and a non-essential portion for service representation. Furthermore, separately from SvcCapabilities describing the capabilities of each service, capabilities of a type of service in which information about the capabilities of the BC portion and the BB portion and portions in which the capabilities of the service are changed with the extension of the service to a hybrid service are directly converged into a final service are described. Of all SLTs, the defined contents are summarized in brief, as shown in FIG. 5, and are indicated by bold letters in FIG. 5. FIG. 5 shows an example of the above-described content, wherein an important portion in the present disclosure is that a broadcast network and a communication network are divided into portions in the case of the hybrid service, and features may be defined for respective portions.

FIG. 5 is a diagram illustrating service elements defined for 8K SHVC service signaling based on broadcast network convergence according to an embodiment.

As illustrated in FIG. 5, information indicating that the corresponding service is a hybrid service may be delivered as configuration information. In the case of the hybrid service, information about broadcastPortion and information about broadbandPortion may be respectively delivered, and information about capabilities of each portion may be signaled together.

In this case, essential information in an existing standard having no hybrid service configuration has attributes and roles similar to those of broadcastPortion@essential, and thus the attribute of Service@essential may be information that can be deleted. Here, the broadcastPortion@essential field may indicate that broadcast data reception and decoding are essential.

The apparatus for transmitting an 8K SHVC service according to an embodiment may be implemented in a computer system such as a computer-readable storage medium.

Figure 6:
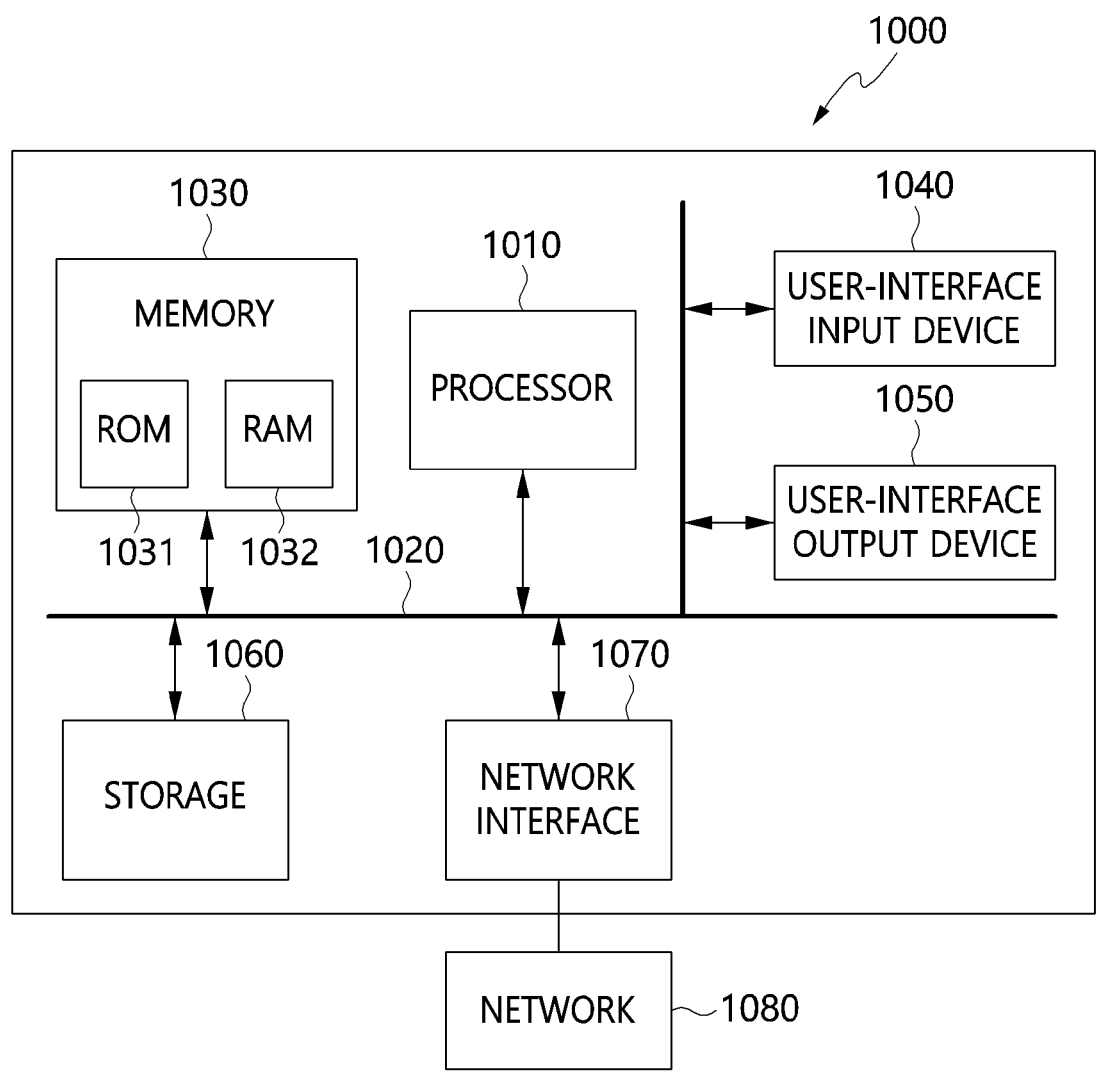
FIG. 6 is a block diagram illustrating the configuration of a computer system according to an embodiment.

FIG. 6 is a block diagram illustrating the configuration of a computer system according to an embodiment.

Referring to FIG. 6, a computer system 1000 according to an embodiment may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. The processor 1010 may be a kind of CPU, and may control the overall operation of the 8K SHVC service transmitting apparatus.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an application-specific integrated circuit (ASIC), a field-programmable gate array (FPGA), etc., without being limited thereto.

The memory 1030 may store various types of data for the overall operation such as a control program for performing a method for transmitting an 8K SHVC service according to an embodiment. In detail, the memory 1030 may store multiple applications executed by the 8K SHVC service transmitting apparatus, and data and instructions for the operation of the 8K SHVC service transmitting apparatus.

Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

In accordance with an embodiment, a computer-readable storage medium for storing a computer program may include instructions enabling the processor to perform a method including an 8K SHVC service transmitting operation.

In accordance with an embodiment, a computer program stored in a computer-readable storage medium may include instructions enabling the processor to perform an 8K SHVC service transmitting method.

Similarly, an apparatus for receiving an 8K SHVC service according to an embodiment may also be implemented in a computer system such as a computer-readable storage medium, and the configuration thereof may correspond to that of the apparatus for transmitting an 8K SHVC service.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present disclosure unless the element is specifically described as "essential" or "critical".

The embodiments may create and transmit the same broadcast content as A/V content having multiple qualities based on a scalable codec, and may then provide a broadcasting service based on Quality of Service (QoS) and Quality of Experience (QoE) in various broadcasting environments.

Further, the embodiments may provide definite service signaling for broadcast network-based 8K SHVC transmission/reception, thus enabling each service to be transmitted/received depending on whether a receiving terminal is capable of reproducing the service.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A method for transmitting an 8K Scalable High Efficiency Video Coding (SHVC) service based on broadcast network interconnection, comprising:
    defining signaling information for the 8K SHVC service, and delivering the defined signaling information to a MPEG Media Transport (MMT)/Real time Object delivery Over Unidirectional Transport (ROUTE) packetizer or to a gateway;
    separating 8K content into a base layer compatible with a broadcast network and an enhancement layer compatible with a communication network;
    delivering the base layer from the MMT/ROUTE packetizer to a receiver through the gateway and a transmitter; and
    delivering the enhancement layer to the receiver through a Dynamic Adaptive Streaming over HTTP (DASH) server,
    wherein the signaling information defines a hybrid service as a value of an 8K SHVC code and a configuration attribute of a SLT.Service element,
    wherein, when the configuration attribute is the hybrid service, information about broadcast data and information about broadband data are respectively delivered, and information about capabilities of respective portions is signaled,
    wherein the information about broadband data indicates that it is defined as other network portions as well as communication network, and then information about service delivered to networks other than currently broadcast network is described.

2. The method of claim 1, wherein any one value of 0x0520 to 0x057F for a Receiver Media Player (RMP) and 0x05A0 to 0x05FF for an Application Media Player (AMP) is assigned to the 8K SHVC code.

3. The method of claim 1, wherein the receiver obtains the base layer over the broadcast network and obtains the enhancement layer using a DASH protocol, thus rendering the 8K SHVC service.

4. The method of claim 1, wherein the receiver receives Low Level Signaling (LLS) and Service Layer Signaling (SLS) in which information about a broadcasting service is described through processing of broadcast reception.

5. The method of claim 4, wherein the receiver is configured to, when it is determined that it is impossible to provide a service for the enhancement layer, receive only data for the base layer, thus rendering a 4K service.

6. An apparatus for transmitting an 8K Scalable High Efficiency Video Coding (SHVC) service based on broadcast network interconnection, comprising:
    a memory configured to store a control program for providing an 8K SHVC service based on broadcast network interconnection; and
    a processor configured to execute the control program stored in the memory,
    wherein the processor is configured to:
    define signaling information for the 8K SHVC service, deliver the defined signaling information to a MPEG Media Transport (MMT)/Real time Object delivery Over Unidirectional Transport (ROUTE) packetizer or to a gateway, separate 8K content into a base layer compatible with a broadcast network and an enhancement layer compatible with a communication network, deliver the base layer from the MMT/ROUTE packetizer to a receiver through the gateway and a transmitter, and deliver the enhancement layer to the receiver through a Dynamic Adaptive Streaming over HTTP (DASH) server,
    wherein the signaling information defines a hybrid service as a value of an 8K SHVC code and a configuration attribute of a SLT.Service element,
    wherein, when the configuration attribute is the hybrid service, information about broadcast data and information about broadband data are respectively delivered, and information about capabilities of respective portions is signaled,
    wherein the information about broadband data indicates that it is defined as other network portions as well as communication network, and then information about service delivered to networks other than currently broadcast network is described.

7. The apparatus of claim 6, wherein any one value of 0x0520 to 0x057F for a Receiver Media Player (RMP) and 0x05A0 to 0x05FF for an Application Media Player (AMP) is assigned to the 8K SHVC code.

8. The apparatus of claim 6, wherein the receiver obtains the base layer over the broadcast network and obtains the enhancement layer using a DASH protocol, thus rendering the 8K SHVC service.

9. The apparatus of claim 6, wherein the receiver receives Low Level Signaling (LLS) and Service Layer Signaling (SLS) in which information about a broadcasting service is described through processing of broadcast reception.

10. The apparatus of claim 9, wherein the receiver is configured to, when it is determined that it is impossible to provide a service for the enhancement layer, receive only data for the base layer, thus rendering a 4K service.

11. A method for transmitting/receiving an 8K SHVC service based on broadcast network interconnection, comprising:
defining signaling information for the 8K SHVC service, delivering the defined signaling information to a MPEG Media Transport (MMT)/Real time Object delivery Over Unidirectional Transport (ROUTE) packetizer or to a gateway, separating 8K content into a base layer compatible with a broadcast network and an enhancement layer compatible with a communication network, delivering the base layer from the MMT/ROUTE packetizer to a receiver through the gateway and a transmitter, and delivering the enhancement layer to the receiver through a Dynamic Adaptive Streaming over HTTP (DASH) server; and
receiving the base layer and the enhancement layer, thus rendering the 8K SHVC service,
wherein the signaling information defines a hybrid service as a value of an 8K SHVC code and a configuration attribute of a SLT.Service element,
wherein, when the configuration attribute is the hybrid service, information about broadcast data and information about broadband data are respectively delivered, and information about capabilities of respective portions is signaled,
wherein the information about broadband data indicates that it is defined as other network portions as well as communication network, and then information about service delivered to networks other than currently broadcast network is described.

12. The method of claim 11, wherein any one value of 0x0520 to 0x057F for a Receiver Media Player (RMP) and 0x05A0 to 0x05FF for an Application Media Player (AMP) is assigned to the 8K SHVC code.

13. The method of claim 11, wherein the receiver obtains the base layer over the broadcast network and obtains the enhancement layer using a DASH protocol, thus rendering the 8K SHVC service.

14. The method of claim 11, wherein the receiver receives Low Level Signaling (LLS) and Service Layer Signaling (SLS) in which information about a broadcasting service is described through processing of broadcast reception.

* * * * *